(12) United States Patent
Szenger et al.

(10) Patent No.: US 6,622,114 B1
(45) Date of Patent: Sep. 16, 2003

(54) METHOD FOR DETERMINING THE WEIGHT OF A PROBE OF A COORDINATE MEASURING MACHINE

(75) Inventors: Franz Szenger, Königsbronn (DE); Günter Grupp, Böhmenkirch (DE); Ralf Bernhardt, Aalen (DE)

(73) Assignee: Carl-Zeiss Stiftung, Oberkochen (DE)

( * ) Notice: Subject to any disclaimer, the term of this patent is extended or adjusted under 35 U.S.C. 154(b) by 0 days.

(21) Appl. No.: 09/599,522

(22) Filed: Jun. 23, 2000

(30) Foreign Application Priority Data

Jun. 26, 1999 (DE) .......................... 199 29 334

(51) Int. Cl.⁷ ............................................. G06F 15/00
(52) U.S. Cl. .................... 702/158; 702/173; 73/580; 177/216; 33/561
(58) Field of Search ........................... 73/580; 177/216; 702/173, 152, 168, 167, 41, 175; 33/559, 561, 556, 557, 558, 560, 832, 572, 503, 504, 505

(56) References Cited

U.S. PATENT DOCUMENTS 3,555,886 A * 1/1971 Thornton .................. 73/580
4,587,853 A     5/1986 Komoto et al.
5,966,681 A    10/1999 Bernhardt et al.

FOREIGN PATENT DOCUMENTS

| DE | 3725207 | 2/1989 |
| EP | 0286107 | 10/1988 |
| EP | 0508670 | 10/1992 |

OTHER PUBLICATIONS

"An Active Piezoelectric Probe for Precision Measurement on a CMM" by Steven D. Bittle and Thomas R. Kurfess, Mechatronics, vol. 7, No. 4, Jun. 1997, pp. 337 to 354, Pergamon Press, Oxford, Great Britain.

* cited by examiner

Primary Examiner—Kamini Shah
Assistant Examiner—Stephen J. Cherry
(74) Attorney, Agent, or Firm—Walter Ottesen

(57) ABSTRACT

The invention is directed to a method for determining the weight of a probe of a coordinate measuring machine wherein the probe is connected to a probe head (1) of the machine. The machine includes a control unit and the weight of the probe (3) is preferably statically determined without active control of the movement of the probe. Signals from the probe (3) and/or the probe head (1) are supplied to the control unit (51).

14 Claims, 4 Drawing Sheets

METHOD FOR DETERMINING THE WEIGHT OF A PROBE OF A COORDINATE MEASURING MACHINE

FIELD OF THE INVENTION

The invention relates to a method for determining the weight of a probe of a coordinate measuring machine wherein the probe is connected to a probe head.

BACKGROUND OF THE INVENTION

U.S. Pat. No. 5,966,681 discloses a method for controlling coordinate measuring apparatus while taking into consideration the weight of the probe. The path acceleration of the probe head is ascertained to determine the weight of the probe. The acceleration of the probe head is determined from the derivation of the time-dependent change of the measured probe head positions or from the derivation of the desired values.

U.S. Pat. No. 5,966,681 discloses a further dynamic method for determining the weight of the probe. In this method, the probe is guided along a circular path. The probe is held in a rest position which the probe assumes in the rest state, by the application of force to the probe. This force is required to hold the probe in the rest position and the weight of the probe is determined from this force.

As already described in U.S. Pat. No. 5,966,681, the determination of the weight of the probe is preferably undertaken in the built-in state because then the determined weight is already present in the system and therefore input errors at the user end are prevented. On the other hand, the weight of the probe is determined already in the configuration provided for the operation. Dynamic methods, however, have the disadvantage that the determined values are subjected to large measurement errors.

Usually, coordinate measuring machines are operable with different probes which are selected in dependence upon the object to be measured. Often, the operators of the coordinate measuring machines themselves configure the probes adapted to their requirements. It is, in principle, possible to already consider the weight of probes in the control of the coordinate measuring machine by the manufacturer of coordinate measuring machines and/or coordinate measuring apparatus. However, this would mean a substantial limitation for the operator who then could utilize only probes offered by the manufacturer of the coordinate measuring machine in limited numbers. Such a significant limitation is, however, in no way desirable.

For the operators of coordinate measuring apparatus, it is desirable to have the freedom to be able to utilize their own probes. However, to be able to continue to guarantee a high measurement accuracy of the coordinate measuring machines (especially at high driving speeds over the surface to be measured), it is necessary that the weight of the probe used at a particular time be known as precisely as possible in order to be able to compensate for occurring centrifugal forces in dependence upon the scanning speed.

SUMMARY OF THE INVENTION

It is an object of the invention to provide an additional and simplified method for determining the weight of the probe which is connected to the probe head. It is a further object of the invention to increase the accuracy in the determination of the weight of the probe.

The method of the invention is for determining the weight of a probe of a coordinate measuring machine having a control unit and a probe assembly which includes a probe head and the probe connected to the probe head. The method includes the steps of: determining the weight of the probe without an active control of the movement of the probe by the coordinate measuring machine; and, conducting signals from the probe assembly to the control unit.

The weight of the probe is determined by means of signals supplied to the control unit from the probe and/or probe head. With this measure, the measuring accuracy can be increased in that the control unit is supplied with signals from the probe and/or probe head. During the determination of the weight, the probe is not driven by the coordinate measuring machine to carry out a movement.

In order to guarantee the determination of the weight of the probe with high accuracy, it has been shown to be advantageous to determine the weight of the probe statically or with the probe freely oscillating. For a static determination, the probe remains in a position during the determination and, for a freely dynamic determination, the probe returns to its rest position from a deflected position without a force acting externally on the probe, that is, from the probe head.

Values averaged over time can be applied in the static determination of the weight of the probe whereby the measuring accuracy is increased. In a static determination, no damping effects occur which are based on the configuration of the probe head and which can be temperature dependent.

Via the simple allocation of a force, which is introduced via the probe head, and an assumed position, which deviates from the rest position (also characterized as a deflection), a conclusion as to the weight of the probe can be drawn from the ratio of the force to the distance. In individual preferred embodiments, it is provided that the probe is charged with a predetermined force whereby a direct conclusion can be drawn as to the weight of the probe from the assumed deflection position while considering a calibration curve.

In a further embodiment, it is provided that a predetermined deflection position is driven to with the probe. The weight of the probe can be determined from the required force while considering a corresponding calibration curve.

It has been shown to be advantageous to provide the probe with an element converting an applied force into electrical signals. Especially piezo elements have been shown to be suitable and are cost effective and operate reliably. These piezo elements exhibit a high internal stiffness whereby an unwanted falsification of the measurement values with respect to the Z component does not occur.

It has been shown to be advantageous to connect the probe to the probe head while interposing the converting element so that at the conclusion of the assembly of the probe, the signals, which characterize its weight, can already be conducted to the control unit. The converting element is arranged between the probe head and a probe head weighing element. This converting element is assigned to a weighing cell which is fixedly connected to the bounding components, for example, by means of adhesive, threaded fasteners, or the like.

If the deflection out of the zero position for the determination of the weight of the probe is stored in the control unit with a corresponding calibration curve of signal value to weight of the probe, then a conclusion can be drawn as to the weight of the probe in dependence upon the supplied signals. The zero position is the position which is assumed by the probe head without the probe.

A probe head can be provided with a compensating spring to compensate for the inherent weight of the probe. For such a probe head, it has been shown to be advantageous that the extent of the displacement of the compensation spring can be applied for the determination of the weight of the probe. Such compensation springs have a first suspension point which can be vertically displaced, for example, by driving a corresponding electric motor. A second suspension point is operatively connected to the probe. Especially electric motors can be provided which are available as standard components and which are provided with incremental transducers so that the weight of the probe is determined by the increments which are detected when driving the electric motor to compensate for the weight of the probe.

If the electric motor has no sensors for recording the adjusted distance, then, as an alternative, it can be provided that the weight of a probe is determined in that the deflection in the z direction is recorded in that the deflection in the z direction is compensated for a short time by the application of current to an actuating device which is provided. In this way, a current is detected which characterizes the deflection. The above deflection in the z direction is based on the weight of the probe. A conclusion as to the weight of the probe can be drawn from the current when a calibration curve is provided.

If the spring constant of the probe head with respect to the z direction (that is, the work direction of gravity) is known, then after taking up the probe, a conclusion can be drawn as to the weight of the probe directly via the recording of the deflection of the probe head.

For a free dynamic determination of the probe weight, the probe is first deflected out of the rest position or zero position. The probe returns to the rest position after being released from this deflection position, that is, it swings back without any action by the coordinate measuring machine. The signals, which characterize the natural frequency of the free swinging system, are supplied to the control unit. The weight of the probe can be derived from the determined natural frequency. In this way, an especially simple method for determining the weight of the probe is made available. In this method, it is not necessary that the assumed deflection position is known nor is the knowledge of the force necessary for the deflection required. The deflection must only be sufficiently large so that the period of oscillation of the free swinging system can be determined with the required accuracy, if needed, by averaging over several detected oscillation periods.

In this system, it has been shown to be advantageous to draw a conclusion as to the weight of the probe in that the weight of the probe is recorded with reference to the natural frequency of the system without the probe and from the change of the natural frequency with the probe. From the change of the natural frequency, a determination of the weight of the probe is made by means of a calibration curve which is preferably stored in a data memory assigned to the control unit. Especially the computation complexity, which is required for the determination of the weight, can be reduced with the stored calibration curves.

In order to determine the weight of the probe with the greatest possible accuracy, it is necessary that the period of oscillation T for the natural frequency is changed as greatly as possible in dependence upon the weight of the probe. The quantity $C=C_o \pm 10\%$ has been shown to be a suitable spring constant wherein: $C_o=2g_o/L$ with L=the length of the freely oscillating system and $g_o$=the weight of the oscillating system without probe.

In a preferred embodiment, it is provided to select a spring constant for the system. For the selection of the spring constant, the estimated weight $g_T$ of the probe is considered. Accordingly, $g=g_o+g_T$ applies wherein:

$$C_o = \frac{2(g_o + g_T)}{L}$$

and $$C=C_o \pm 10\%.$$

It has been advantageously shown to determine the spring constant of the probe head in that the probe head is pivoted by 90° into the horizontal position. Then, the probe head is deflected in the horizontal plane and the spring constant results from the ratio of deflection to required force.

A further advantage, independent of the selected method for determining the weight, is that, when the weight of the probe used is known, an overloading especially of the spring system in the probe head is prevented in that, for a weight of the probe, which exceeds a maximum value, the measuring operation is not permitted with the coordinate measuring machine. In this way, the operator is simultaneously signaled that the mounted probe is not suitable for the operation with this coordinate measuring machine.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
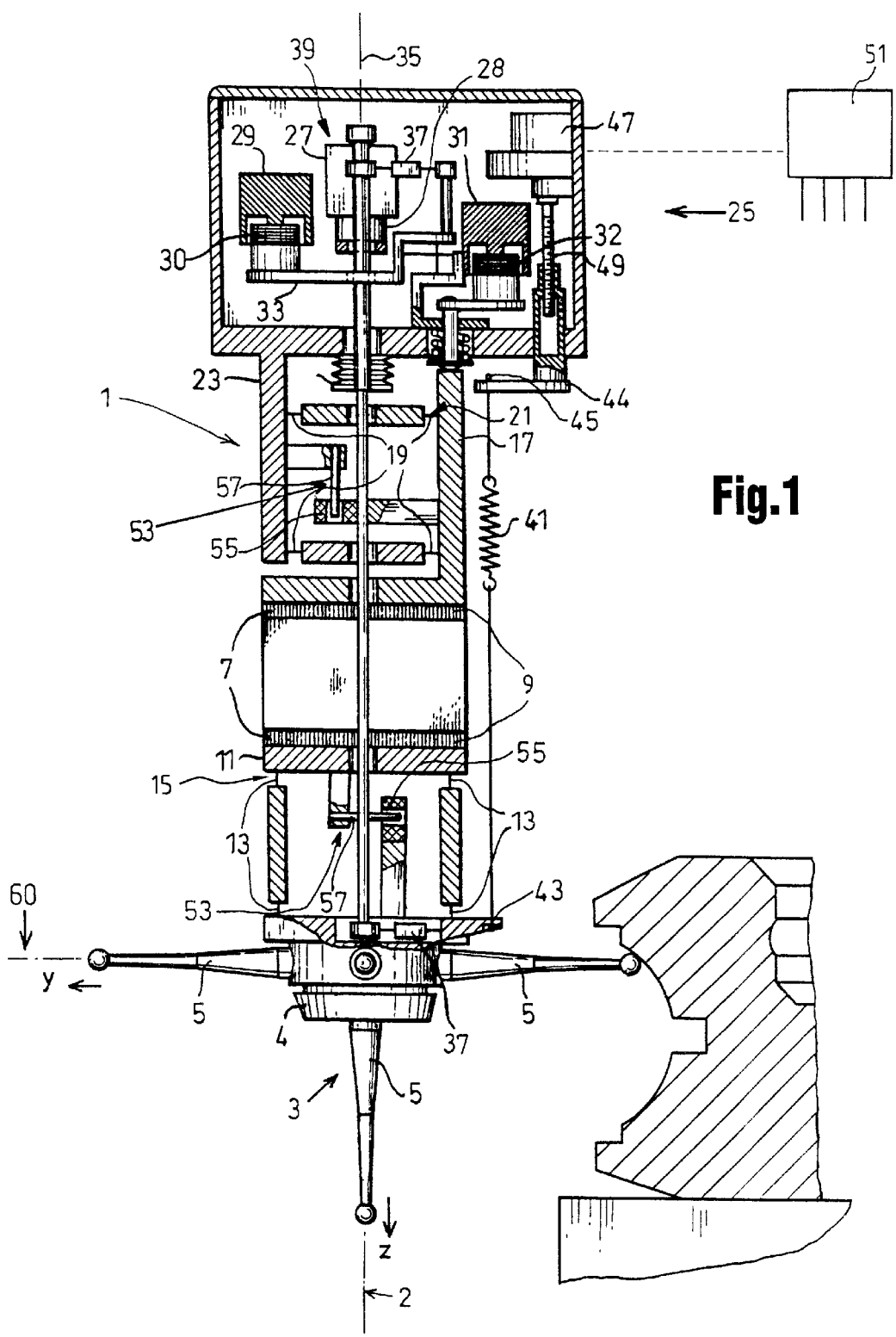
FIG. 1 is a side elevation view, partially in section, of a probe head of a coordinate measuring machine.

Referring to FIG. 1, the configuration of the probe head 1 will first be explained in detail. The probe head 1 has a probe 3 securely connected thereto. The probe has, for example, a series of star-shaped arranged probe pins 5 and is connected to a plate 11 via a spring parallelogram 15 having four leaf springs 13. On the other hand, the plate 11 is attached to an angle piece 17 via a further spring parallelogram 9 whose leaf springs 7 act on the plate 11 displaced by 90° to the leaf springs 13.

The angle piece 17 is suspended via a third spring parallelogram 21 from a connecting piece 23. The spring parallelogram 21 includes horizontally lying leaf springs 19. The connecting piece 23 is rigidly connected to an upper part 25 or acts on the angle piece 17. A Cartesian coordinate system (x,y,z) is provided via this torsion stiff series connection of three play and friction free linear guidance systems. The angle piece 17 is, for example, herein movable parallel to the z direction and the plate 11 is movable parallel to the z and x directions and a probe chuck 4 including probe 3 is movable parallel to the x, y and z directions.

In the upper part 25 of the probe head 1, there are, for example, three plunge coil systems (28, 30, 32) having respective annular gap magnets (27, 29, 31) which are fixedly journalled in this part 25. The plunge coils (28, 30, 32) are pulled in or pushed out of an average zero position into the annular gaps of the magnets (27, 29, 31) depending upon the current direction of the current inputted into the plunge coils (28, 30, 32). The current conductance of each individual plunge coil (28, 30, 32) can be selectively switched on and switched off or be controlled electronically by means of the control unit 51 in order to introduce an application of force in a targeted manner. The movements of the plunge coils (28, 30, 32) are transmitted by means of a lever 33 and further elastically interconnected transmitting elements 37 to the probe chuck 4. The lever 33 is rotatably journalled about an axis 35 in the upper part 25. With the elements 27 to 37, a plunge coil system 39 is formed. By means of this plunge coil system 39, an application of force to the probe 3 can be introduced in a targeted manner by means of a predetermined current application of at least one of the coils (28, 30, 32).

The movement of the probe 3 is recorded by sensors 53 provided in the probe head 1. In this embodiment, inductive systems having a coil 55 and a magnet 57 are provided as sensors 53 and correspond to the plunge coil system 39 for introducing a movement of the probe 3.

With the probe head 1, various probes 3 can be used which are matched to the object to be measured. These probes 3 have, as a rule, a different weight. To compensate the deflection in the z direction, which is caused by this weight, the probe head 1 is provided with a compensation spring 41 which has a first suspension point 43 acting on the probe chuck 4. A second suspension point 45 lies opposite and acts on a vertically movable component 44. In the embodiment shown, this second suspension point 45 is operatively connected to a threaded spindle 49 which can be driven by means of a motor 47 fixedly arranged at a location in the upper part 25 of the probe head 1. From a rotational movement of the spindle 49, a movement of the suspension point 45 in the vertical direction results which is here the z direction. The compensation spring 41 is connected in parallel to the spring parallelogram 21.

In the following, a method is explained in greater detail for determining the weight of the probe 3 which is mounted at any particular time.

Figure 2:
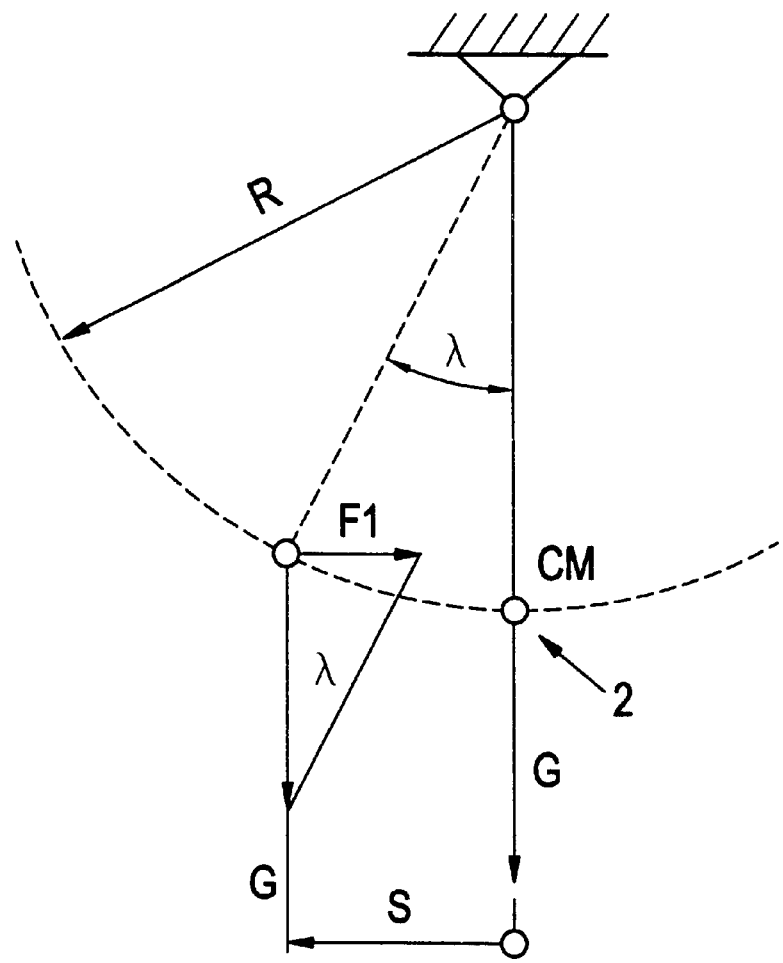
FIG. 2 is a schematic representation of a pendulum system.

When a coordinate measuring machine (not shown) is taken into service, a predetermined force is introduced by applying current preferably to one of the coils (28, 30, 32). This application of force results in a deflection of the probe 3 out of its rest position 2. This deflection is detected by the sensors 53. Because of the spring parallelograms (9, 15, 21), which are provided for each direction of movement, the probe 3 and therefore the center of gravity CM of the mass to be determined) defines a circular arc having a radius R with the deflection as shown in FIG. 2. The weight CM, which acts via the probe 3, can be broken down into a perpendicular component G and into a component $F_1$ running parallel to the plane extending in the x,y directions. For small deflecting angles λ, the following applies:

$$\tan \lambda \approx \lambda = S/R$$

wherein: R is the radius of the circular arc along which the probe 3 is deflected. For the horizontal return force $F_1$, which results from the weight of the probe 3, the following applies:

$$F_1 = G^* \tan \lambda = G^* S/R.$$

Since the probe 3 is deflected against the spring force of one or several of the spring parallelograms (9, 15), elastic return forces act via the leaf springs (7, 13) of at least one of the spring parallelograms (9, 15) for which the following applies:

$$F_C = C^* S$$

and, for the total return force, the following applies:

$$F = F_1 + F_C = G^* S/R + C^* S$$

For an assumed deflecting position, the weight is increased by ΔG by the take-up of the probe 3. In order to now hold the deflection S constant, the force must be increased by ΔF and the following applies:

$$F + \Delta F = (G + \Delta G)*S/R + C*S = S*G/R + \frac{S*\Delta G}{R} + C*S$$

and $$\Delta F = F + \Delta F - F = S*G/R + S\frac{\Delta G}{R} + C*S - (S*G/R + C*S)$$

And therefore the following applies:

$$\Delta F = S\frac{\Delta G}{R}$$

With the use of the plunge coils, the introduced force is proportional to the current I and/or to the voltage U with which the plunge coil 27 is supplied with the deflection in the x direction. The following applies:

$$\Delta F = K^* \Delta U$$

wherein K is a proportionality factor and the following applies:

$$\Delta G = K^* \Delta U^* R/S.$$

In the above, R is known because of the configuration of the probe head so that for an input of a constant deflection, the distance S is also a constant so that the product K*R/S can be combined to a constant q and the following applies:

$$\Delta G = q^* \Delta U.$$

With a calibration measurement wherein a known weight of the probe pin chuck 4 is included, this constant g can be determined. For a change of the weight because of a desired mounted probe 3, in this way, a conclusion can then be drawn directly as to the weight of the probe 3 in dependence upon the change of the voltage which is required in order to continue to maintain the predetermined deflection position.

It can also be provided to induce a deflection out of the rest position 2 by means of introducing a predetermined force. The extent of the deflection S is recorded. Based on this recorded extent, the weight ΔG of the probe is determined as will be explained in greater detail in the following.

Initially, the spring constant C of the spring parallelograms (21, 15, 9) is determined by a one-time calibration measurement. All of the spring parallelograms (21, 15, 9) are built up identically and differ only as to their spatial orientation. The spring constant C of the spring parallelogram 9 can be determined in an especially simple manner in that the probe head 1 is brought into a horizontal position and, while it is braced on a plane or plate, is deflected parallel to the x,y plane by an application of current, for example, to the plunge coil 32. The deflection in a direction, which is parallel to the horizontal plane, is also possible for determining the spring constant C of a further spring parallelogram 21 or 15. The value C for the spring parallelograms (9, 15, 21) for all directions is identical because of the assembly of the probe head 1 in the illustrated embodiment and therefore the determination of the spring constant with respect to one component is adequate. Since the probe head 1 is moved in a horizontal plane, a conclusion can be drawn directly as to the spring constant from the application of current to the plunge coil because of the proportionality of the current to the introduced force. This is done by neglecting the friction force which is between the horizontal support surface and the probe 3 because of the weight of the probe 3 and the probe head 1.

For the mounted probe 3, a conclusion can be drawn directly as to the mass or weight of the probe 3 in dependence upon a sensed deflection in the z direction because the spring constant of the spring parallelogram is known. It can also be provided to position the probe 3 at a predetermined zero position 60 for a short time via the application of current to the plunge coil 31. The zero position 60 is preferably assumed by the probe pin chuck 4 when no probe 3 is taken up. Then, a conclusion can be drawn as to the weight of the probe 3 in dependence upon the required current. It can also be provided to position the probe 3 at a predetermined zero position 60 by driving the L motor 47. The path which the suspension point 45 thereby traverses is detected. For recording this path, the use of a motor can be provided having an incremental transducer (not shown). Such motors, which are provided with an incremental transducer, are available as standard components.

Figure 3:
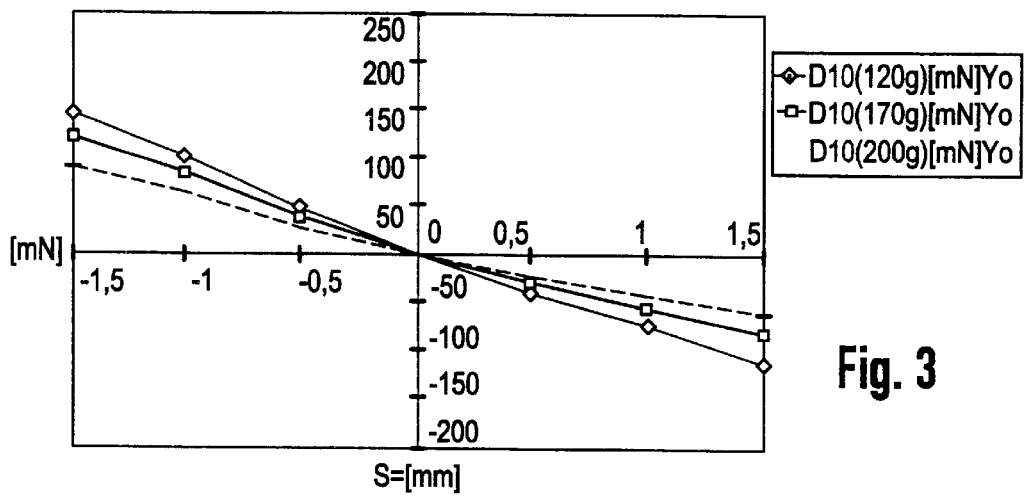
FIG. 3 is a graph showing the applied force with reference to the resulting deflection for probes having different weights or masses.

In FIG. 3, the dependency of the required force is shown in dependence upon the deflection from the rest position for probes 3 having different weights.

Figure 4:
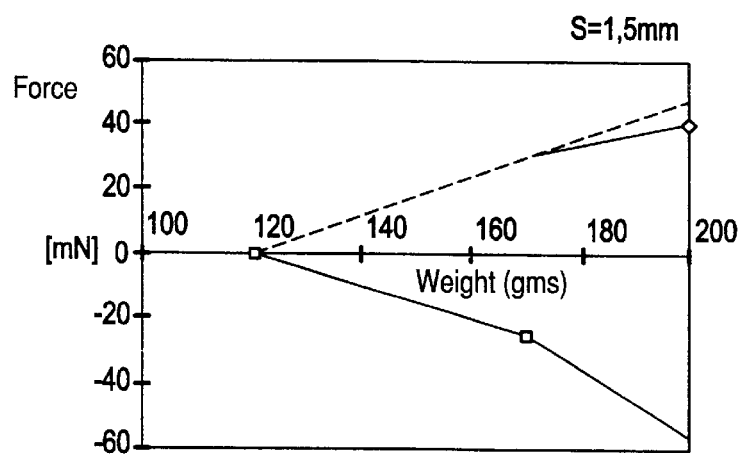
FIG. 4 is a graphic representation of the required force for a predetermined deflection in dependence upon the weight of the probe.

In FIG. 4, the dependency of the required force upon the weight of the probe for a constant deflection is shown with the deflection here being in the amount of 1.5 mm.

Figure 5:
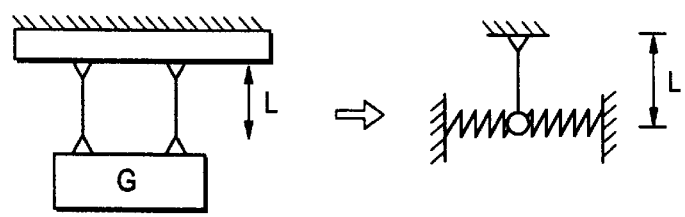
FIG. 5 is a schematic representation of a spring system.

In the following, the method of the free dynamic determination of the weight of the probe 3 based on the natural frequency of the system is described in greater detail with reference to FIGS. 2 and 5.

The probe head 1 includes a plurality of spring parallelograms (9, 15, 21). For such a spring parallelogram, a simplified system shown in FIG. 5 can be assumed. When neglecting the mass of the components of the spring parallelogram, one obtains the system of a pendulum having an additional operating spring force with reference to the horizontal direction of movement. This approximation is at least for small deflection angles A sufficiently accurate for which also sin A≃S/R can be assumed. For this reason, in turn, the following applies for the acting forces F of the total system:

$$F = F_1 + F_C = G*S/R + C*S.$$

In this way, the following applies for the spring constant D of the entire system:

$$D = G/R + C$$

wherein C is the spring constant of the spring parallelogram.

For the period of oscillation of the freely oscillating system the following applies:

$$T = 2\pi \frac{m}{G/R + C}$$

wherein: G=m*g and wherein m is the mass and g is the force of gravity so that G defines the weight or weight force.

The following applies for the determination of the weight of the probe from the period of oscillation of the freely oscillating system:

$$G/R \ll C$$

wherein, for C, the following applies:

$$C \approx 2G/R.$$

Under these conditions, the change of the period of oscillation in dependence upon the weight to be determined is a maximum.

For the determination of the weight of the probe 3, which is mounted, it can be provided that the determined period of oscillation is set into relationship with the period of oscillation of the system without the probe 3 and without the probe chuck 4. The weight of the probe chuck 4 contributes only to an increase of the weight difference and therefore to an increase of the measuring accuracy.

The probe mass is present directly based on a determined period of oscillation of the freely oscillating system based on the stored calibration curves.

In the following, a possible method for determining the period of oscillation of the freely oscillating system is described in greater detail.

The probe 3 is deflected out of the rest position 2. The force, which acts for this deflection, is abruptly withdrawn whereupon the probe 3 swings freely back into the rest position. Signals which characterize the movement of the probe 3, and especially the movement reversal of the probe 3, are transmitted by the sensors 53 to the control unit 51.

The period of oscillation results from the time difference between these points of the movement reversal. As explained above, the weight of the probe used is derived or determined from this period of oscillation.

Figure 6:
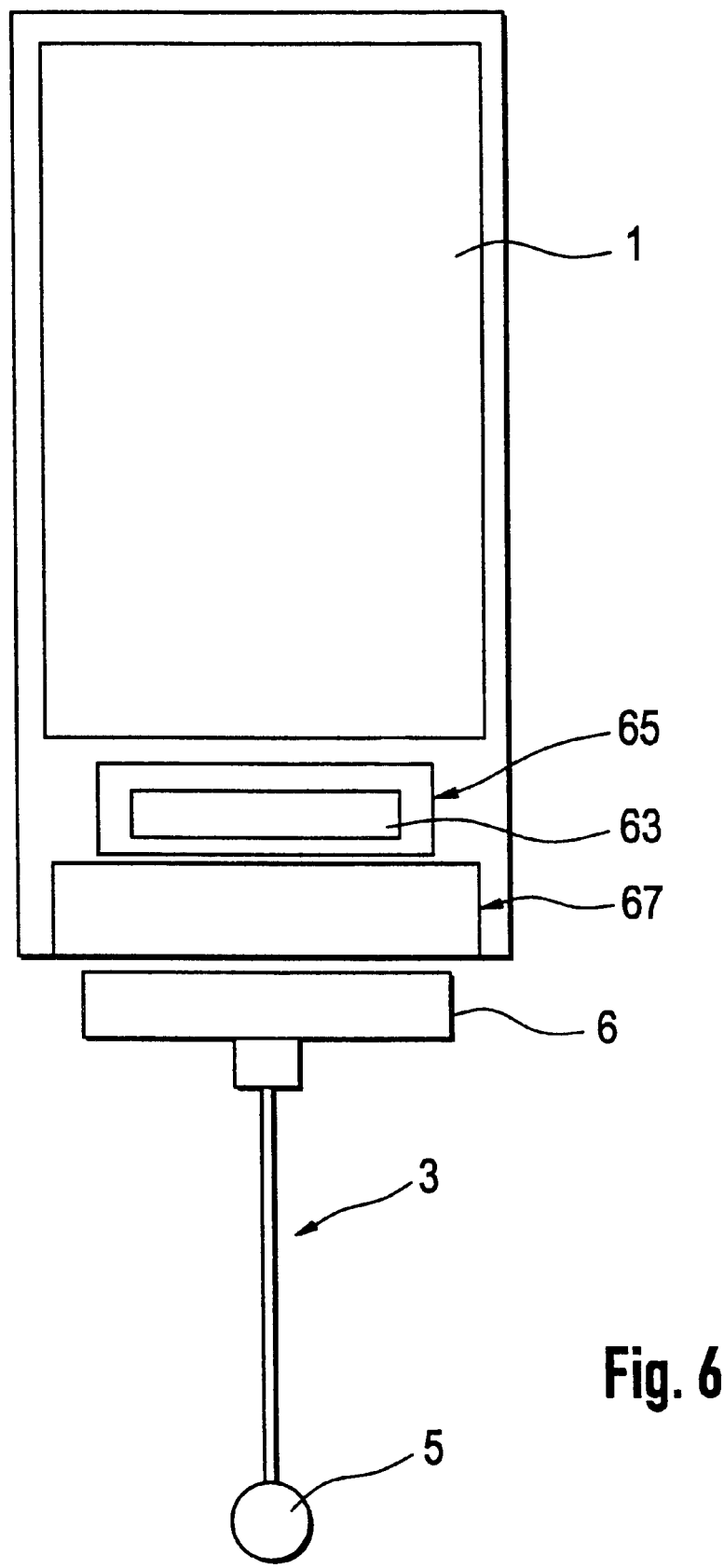
FIG. 6 is a schematic representation of a probe head having a weighing cell.

In FIG. 6, a probe head 1 is shown which includes a weighing cell 65 which is provided for a weight determination of the probe weight. This weighing cell 65 is arranged between the probe head 1 and a probe exchange unit 67. The weighing cell 65 is, on the one hand, connected fixedly to a component of the probe head 1 and, on the other hand, is connected permanently to the probe exchange unit 67, for example, by means of adhesive, threaded fasteners or the like. The weighing cell 65 includes, in turn, for example, a piezo element 63 as a converting element which supplies a voltage value in dependence upon the weight of the mounted probe 3. The weight of the probe exchange unit 67 also measured in each case, is subtracted as an offset value.

A unit is formed by the probe exchange unit 67 and a probe pin plate 6 which is connected to the probe exchange unit 67 via a three-point bearing arrangement.

All of these methods described above for determining the weight of the mounted probe 3 have in common that the probe 3 is not actively guided on any movement path pregiven by the coordinate measuring machine.

A determination of the weight of the probe is carried out with each exchange of a probe and this determination is made whenever the coordinate measuring apparatus is taken into service.

It is understood that the foregoing description is that of the preferred embodiments of the invention and that various changes and modifications may be made thereto without departing from the spirit and scope of the invention as defined in the appended claims.

What is claimed is:

1. A method for determining the weight of a probe of a coordinate measuring machine having a control unit and a probe assembly which includes a probe head and the probe connected to the probe head, the method comprising the steps of:

applying a force to said probe assembly via said control unit to deflect said probe out of a rest position;

sensing the deflection of said probe out of said rest position; and, determining the weight of said probe from a ratio of said force and said deflection.

2. The method of claim 1, comprising the further steps of:

assigning an element to said probe which converts said force into an electrical signal; and, supplying said electrical signal to said control unit.

3. The method of claim 2, wherein said element is a piezoelectric device.

4. The method of claim 2, wherein said element is interposed between said probe head and said probe.

5. The method of claim 1, wherein said force applied to said probe assembly is a predetermined force.

6. The method of claim 1, wherein said probe head includes a drive unit for applying a force to said probe assembly for deflecting said probe; and, wherein the method comprises the further steps of:

noting the zero position assumed by said probe head without said probe being connected thereto;

with said probe connected to said probe head, positioning said probe at said zero position by driving said drive unit to apply a force to said probe; and, determining the weight of said probe from said force.

7. The method of claim 1, comprising the further steps of:

providing said probe head with a compensation spring for compensating for the weight thereof and said compensation spring having a first suspension point not connected to said probe and a second suspension point operatively connected to said probe;

noting the zero position assumed by the chuck of said probe head without said probe being connected thereto; and, after connecting said probe to said probe head, vertically displacing said suspension point so as to cause said chuck to again assume said zero position with the displacement causing a deflection of said probe.

8. A method for determining the weight of a probe connected to a probe head and deflectable out of a rest position, the method comprising the steps of:

providing a control unit connected to said probe;

deflecting said probe out of a rest position to a deflected position;

releasing said probe from said deflected position to allow said probe to freely oscillate thereby providing a freely oscillating system;

conducting signals to said control unit for determining the natural frequency of said freely oscillating system; and, determining the weight of said probe from said natural frequency of said freely oscillating system.

9. The method of claim 8, wherein said freely oscillating system is a system having a spring constant (C) for which the following applies:

$$C = C_o \pm 10\%$$

wherein:

$C_o = 2g_o/L$ and is the spring constant of said freely oscillating system without said probe;

L = the length of the freely oscillating system without said probe; and, $g_o$ = the weight of said freely oscillating system without said probe.

10. The method of claim 9, wherein said spring constant includes the estimated weight ($g_T$) of said probe; and, wherein:

$$g = g_o g_T$$

and $$C_o = 2(g_o + g_T)/L.$$

11. The method of claim 8, wherein the determination of the weight of said probe is carried out with each exchange of a probe.

12. The method of claim 11, wherein said determination is made whenever said coordinate measuring machine is taken into service.

13. A coordinate measuring machine having a probe assembly which includes a probe head and a probe which can be connected to the probe head, the coordinate measuring machine comprising:

an arrangement assigned to said probe head and said arrangement including a control unit for carrying out a method for determining the weight of said probe;

said control unit and said probe assembly conjointly defining means for deflecting said probe out of a rest position to a deflected position;

said control unit and said probe assembly also conjointly defining means for releasing said probe from said deflected position to allow said probe to freely oscillate thereby providing a freely oscillating system;

said arrangement further including means for conducting signals from said probe assembly to said control unit for determining the natural frequency of said freely oscillating system; and, said control unit including means for determining the weight of said probe from said natural frequency of said freely oscillating system.

14. The coordinate measuring machine of claim 13, wherein the determination of said weight is made statically or with said probe freely oscillating.

* * * * *

UNITED STATES PATENT AND TRADEMARK OFFICE
CERTIFICATE OF CORRECTION

PATENT NO.     : 6,622,114 B1
DATED          : September 16, 2003
INVENTOR(S)    : Franz Szenger, Guenter Grupp and Ralf Bernhardt It is certified that error appears in the above-identified patent and that said Letters Patent is hereby corrected as shown below:

<u>Column 5,</u>
Line 54, delete "and" and substitute -- (and -- therefor.

<u>Column 7,</u>
Line 29, delete "L motor" and substitute -- motor -- therefor.
Lines 53 and 54, delete "A" and substitute -- λ -- therefor.

Signed and Sealed this

Second Day of March, 2004

JON W. DUDAS
*Acting Director of the United States Patent and Trademark Office*